United States Patent [19]
Uchida et al.

[11] 3,958,874
[45] May 25, 1976

[54] PICTURE INFORMATION RETRIEVING SYSTEM

[75] Inventors: Shigeru Uchida; Kanji Yamamoto, both of Hitachi, Japan

[73] Assignee: Hitachi, Ltd., Japan

[22] Filed: Apr. 12, 1974

[21] Appl. No.: 460,477

[30] Foreign Application Priority Data
Apr. 13, 1973 Japan.............................. 48-41293

[52] U.S. Cl.............................. 353/26 A; 250/557
[51] Int. Cl.²................. G03B 23/12; G03B 21/28
[58] Field of Search ............. 250/557, 561; 353/25, 353/26, 27, 26 AR, 27 AR

[56] References Cited
UNITED STATES PATENTS

| | | | |
|---|---|---|---|
| 3,299,272 | 1/1967 | Furakawa ........................... | 250/561 |
| 3,582,660 | 6/1971 | Muller ................................ | 250/561 |
| 3,700,320 | 10/1972 | Brewer................................ | 353/26 |
| 3,730,619 | 5/1973 | Fujimoto............................. | 353/26 |
| 3,744,890 | 7/1973 | Suzaki............................. | 353/26 A |
| 3,802,771 | 4/1974 | Mickelson............................ | 353/26 |

*Primary Examiner*—Richard E. Aegerter
*Assistant Examiner*—A. J. Mirabito
*Attorney, Agent, or Firm*—Craig & Antonelli

[57] ABSTRACT

A picture information retrieval system in which each time an initial position detecting mark provided in correspondence with the first picture on an information recording medium for detecting the first picture passes the initial position during the retrieval operation the content of the counting section is corrected.

6 Claims, 3 Drawing Figures

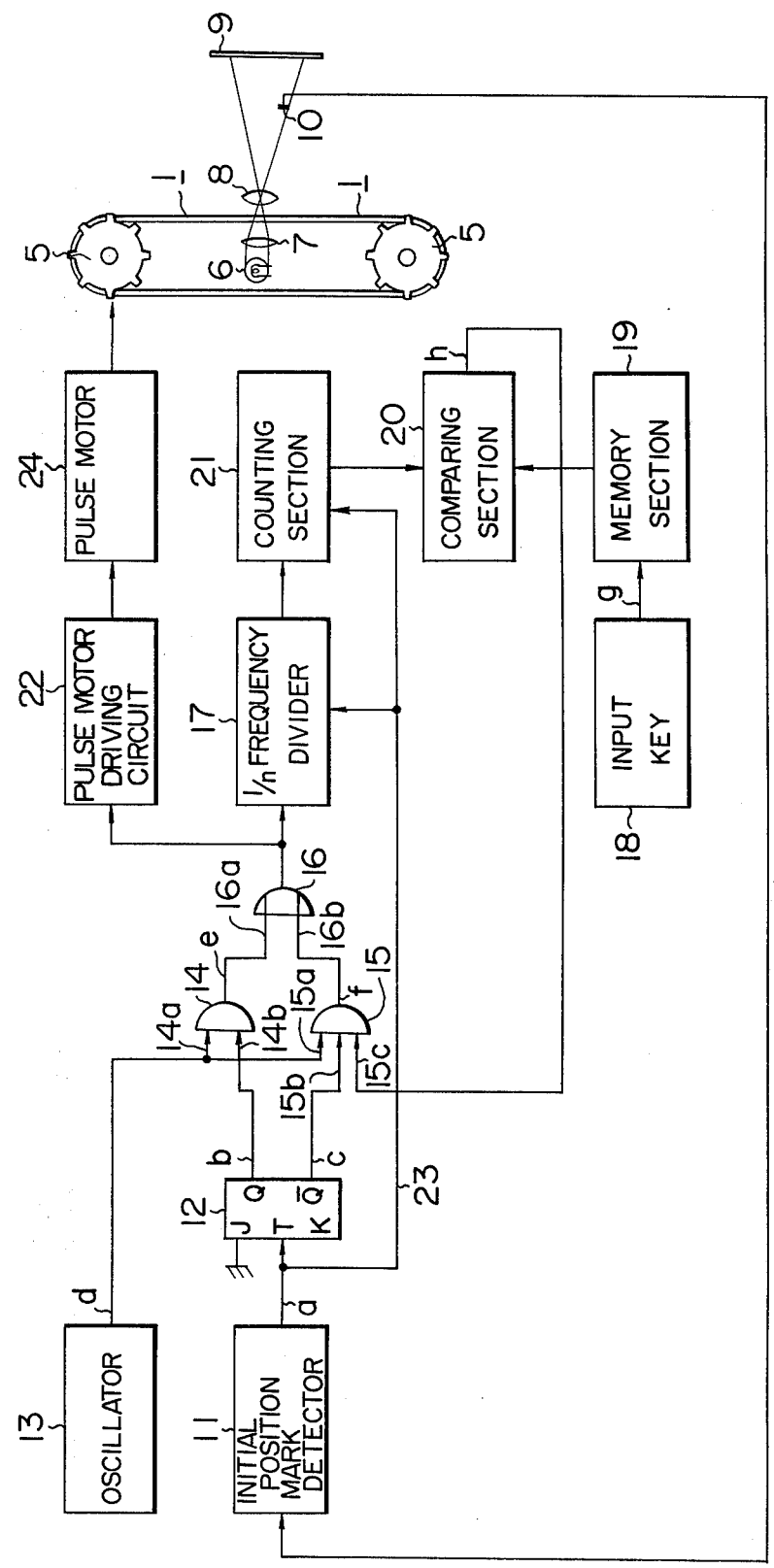
F I G. 2

PICTURE INFORMATION RETRIEVING SYSTEM

BACKGROUND OF THE INVENTION

1. Field of the Invention

The present invention relates to a picture information retrieving system employing an information recording medium carrying a number of pieces of picture information capable of being optically projected.

2. Brief Description of the Prior Art

In a conventional retrieval system in which a photographic film strip provided with perforation is driven by a pulse motor through a sprocket mechanism, the pitch $p$ of the frames, the number $n$ of pulses necessary to feed the film strip by one pitch $p$, and the distance $\tau$ the film strip is caused to travel by the pulse motor with one pulse are generally designed such that the relation $p=n.\tau$ stands. However, in actual practice, due to the manufacturing unevenness or dispersion of the sizes of the parts of the mechanism the actual stopping position may differ from the designed one. When a number of retrieving operations are conducted, the discrepancies between the actual and designed stopping positions may be accumulated for individual retrieving operations to augment the final discrepancy. Also, when the content of the counting section is changed due to some noise or the like during the retrieving operation, the malretrieval is maintained for the subsequent retrievals. No appropriate means for correcting these disadvantages have been provided.

SUMMARY OF THE INVENTION

An object of the present invention is to provide a picture information retrieving system in which the above-described malretrieval due to noise and the discrepancy between the pitch of frames of a photographic film strip and that of the film feeding mechanism are prevented to improve the accuracy of the picture stopping position.

The feature of the present invention is that at the power feeding time the first picture on an information recording medium is optically projected on a screen by detecting an initial position detection mark provided on the information recording medium, and at the retrieving time the counting section is reset to correct the content thereof.

BRIEF DESCRIPTION OF THE DRAWING

FIG. 2 is a control circuit.

DESCRIPTION OF THE PREFERRED EMBODIMENT

Figure 1:
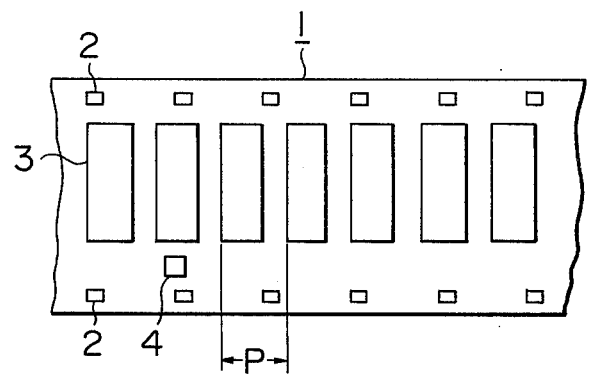
FIG. 1 is an example of an information recording medium.

Referring to FIG. 1 a photographic film strip 1 has pictures 3, an initial position detection mark 4 associated with the first picture, and perforations 2.

In FIG. 2 reference numeral 5 designates sprockets, reference numeral 6 designates a light source lamp, reference numeral 7 designates a condenser lens, reference numeral 8 designates a projection lens, reference numeral 9 designates a screen, reference numeral 10 designates a light sensitive element, reference numeral 11 designates an initial position mark detector, reference numeral 12 designates a flip-flop, reference numeral 13 designates an oscillator, reference numeral 14 designates an AND gate having inputs 14a and 14b, reference numeral 15 designates an AND gate having inputs 15a, 15b and 15c, reference numeral 16 designates an OR gate having inputs 16a and 16b, reference numeral 17 designates a l/n frequency divider, reference numeral 18 designates an input key, reference numeral 19 designates a memory section, reference numeral 20 designates a comparing section, reference numeral 21 designates a counting section, reference numeral 22 designates a pulse motor driving circuit, and reference numeral 24 designates a pulse motor. In the embodiment of FIG. 2, a roll-formed film strip 1 is preferably used as shown.

Figure 3:
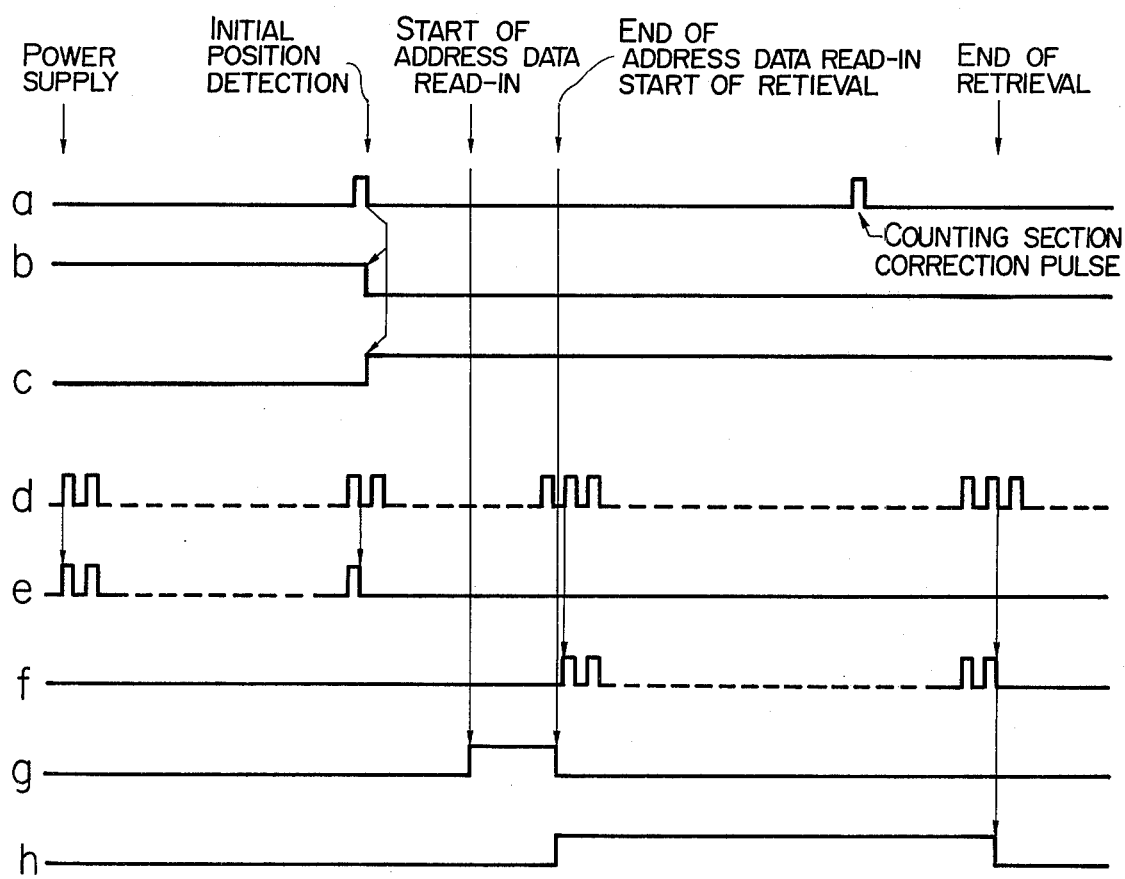
FIG. 3 is a timing chart for various parts in the control circuit of FIG. 2.

FIG. 3 is a timing chart at the parts $a, b, \ldots, h$ in FIG. 2.

The operation of the system is as follows: When a power is fed, the output $b$ of the flip-flop 12 becomes H (high level) as shown at $b$ in FIG. 3. Then, the output pulse $d$ of the oscillator 13 is supplied to the pulse motor driving circuit 22 through the AND gate 14 and the OR gate 16 to drive the pulse motor 24, hence the sprockets 5 enabling the film strip 1 to travel. When the initial position detection mark 4 is received by the light sensitive element 10, the initial position mark detector 11 supplies an output pulse a to the flip-flop 12 to reset it. Then, the output $b$ of the flip-flop 12 becomes L (low level) as shown in FIG. 3 so that the AND gate 14 is closed to block the output pulse of the oscillator 13 from reaching the pulse motor driving circuit 22. Thus, the pulse motor 24 is stopped and the first picture on the film strip 1 is projected on the screen 9.

The retrieving operation is as follows: The aimed address data is supplied by the input key 18 to the memory section 19. When the read-in of the address data is completed, the output $h$ of the comparing section 20 becomes H as shown in FIG. 3, hence is provided on the input 15c to the AND gate 15. On the other hand, since the flip-flop 12 is already reset at the time of completion of the initial position, the output $c$ thereof and hence the input 15b to the AND gate 15 is H, so that the AND gate 15 is opened to pass the output pulse of the oscillator 13 therethrough and the OR gate 16 to the pulse motor driving circuit 22. Thus, the pulse motor 24 and hence the film strip 1 is driven to enable the retrieval.

On the other hand, the output pulse of the oscillator 13 is supplied to the l/n frequency divider 17 which produces one pulse for the number of pulses necessary for allowing one frame of the film strip 1 to travel (assumed to be $n$). The output pulse of the l/n frequency divider 17 is supplied to the counting section 21. The retrieving operation is carried out until the contents of the counting section 21 and the memory section 19 coincide. When they coincide with each other, the output $h$ of the comparing section 20, hence the input 15c to the AND circuit 15 becomes L as shown in FIG. 3 to close the AND gate 15. Thus, the output pulse of the oscillator 13 is blocked by the AND gate 15 from reaching the pulse motor driving circuit 22 to interrupt the movement of the pulse motor 24. With this the retrieving operation is completed. During the above retrieving operation or during a number of retrieving operations the initial position detection mark 4 passes the light sensitive element 10. Then, a correction pulse for the counting section 21 as shown in FIG. 3 is supplied from the output a of the initial position mark detector 11 through the signal line 23 to the l/n frequency divider 17 and the counting section 21 to correct the contents thereof to those at the time of the initial position. Thus, in the retrieving operation the light sensitive element 10 detects the initial position mark 4 to correct the contents of the l/n frequency divider 17 and the counting section 21 to those at the initial position time.

Since, as described above, the initial position mark 4 is used not only for the detection of the initial position of the picture, but also for the correction of the contents of the l/n frequency divider 17 and the counting section 21, the performance of the system is greatly improved because the mal-retrieval due to change of contents of the l/n frequency divider 17 and the counting setion 21 by noise and the reduction of the accuracy of stopping position of the picture due to a slight deviation of the above-mentioned relation, $p = n.\tau$, caused by some reasons on the characteristic of the pulse motor 24 and the film driving mechanism are corrected at the initial position. Moreover, since the initial position mark 4 is used for both purposes as described above, the system is inexpensive.

If the first picture recorded on the film strip 1 is the contents of the information recorded on the film strip 1 and if the initial position mark 4 is attached to the first picture, the film strip 1 is stopped at the first picture to optically project the first picture on the screen, so that whether or not the desired piece of information is recorded on the film strip can be ascertained to simplify the restrieving job.

In the above embodiment a photographic film strip is utilized as the information recording medium. However, the present invention is not limited to the photographic film strip. A microfiche, microfilm jacket, optical card, or the like can likewise be utilized.

We claim:

1. In a picture information retrieving system including a counting section for counting pictures on an information recording medium, a memory section for setting therein the sequence number of a desired picture in advance, a comparing section for comparing the output signal of the memory section and the output signal of the counting section, driving means for moving the information recording medium, a driving circuit controlled by the output signal of the comparing section for driving the driving means to move the information recording medium, the improvement comprising only one detection mark provided in correspondence with the first picture on the information recording medium for indicating the initial position of the recording medium, means for detecting the initial position detection mark, means for resetting the counting section in accordance with the detected signal from said initial position mark detecting means during the retrieving operation to correct the content thereof, and means for controlling said driving circuit in response to the detection of the initial position detection mark to stop the driving means.

2. A picture information retrieving system according to claim 1, wherein the controlling means controls the driving means so that the first picture on the information recording medium is optically projected on a screen immediately after power supply.

3. A picture information retrieving system according to claim 1, wherein said information recording medium consists of a roll-formed film strip on which the pictures are carried.

4. A picture information retrieving system according to claim 2, wherein a perforation is provided in correspondence with each of the pictures, and the counting of the pictures is carried out by counting the perforations.

5. A picture information retrieving system according to claim 2, wherein said driving means consists of a pulse motor.

6. A picture information retrieving system according to claim 1, wherein said counting section includes a frequency divider and a counter, said frequency divider being responsive to oscillation signals for providing divided oscillator signals to said counter for counting, said frequency divider and said counter being reset by said detecting means during the retrieval operation.

* * * * *